United States Patent [19]

Schreier et al.

[11] Patent Number: 4,786,078
[45] Date of Patent: Nov. 22, 1988

[54] SHOULDER BELT ADJUSTER

[76] Inventors: Steven E. Schreier, 817 Belland Ave., Vadnais Heights, Minn. 55110; John E. Schreier, 5641 21st Avenue South, Minneapolis, Minn. 55417

[21] Appl. No.: 64,668

[22] Filed: Jun. 22, 1987

[51] Int. Cl.⁴ .................. B60R 22/12; B60R 22/30
[52] U.S. Cl. .................................... 280/808; 297/483
[58] Field of Search ............... 280/801, 808; 297/483, 297/486, 468, 473

[56] References Cited

U.S. PATENT DOCUMENTS

| 3,526,432 | 9/1970 | Jensen et al. | 297/483 |
| 3,698,048 | 10/1972 | Weman | 280/808 |
| 3,713,693 | 1/1973 | Cadiou | 280/808 |
| 3,964,798 | 6/1976 | Burleigh | 280/808 |
| 4,236,755 | 12/1980 | Pollitt et al. | 280/808 |
| 4,541,654 | 9/1985 | Jonasson | 280/801 |
| 4,619,468 | 10/1986 | Spill | 280/801 |
| 4,681,345 | 7/1987 | Swartout | 280/801 |

FOREIGN PATENT DOCUMENTS 1040964  1/1966  United Kingdom ............... 280/808

Primary Examiner—Richard A. Bertsch
Attorney, Agent, or Firm—Jacobson and Johnson

[57] ABSTRACT

A shoulder belt adjuster for positioning the lower end of a shoulder belt/lap belt combination having a housing which can be clamped to a lap belt to hold the shoulder belt adjuster in a fixed position on the lap belt and a looped member connected to the housing for forming a loop for slideably supporting a shoulder belt to permit positioning of the lower end of the shoulder belt.

6 Claims, 2 Drawing Sheets

SHOULDER BELT ADJUSTER

BACKGROUND OF THE INVENTION

1. Field of the Invention.

This invention generally relates to attachment for shoulder belts and, more specifically, an attachment to permit positioning of the lower end of a shoulder belt.

One of the difficulties with conventional automobile shoulder and seat belts is that they have only one position. Consequently, for shorter adults and children the shoulder belt rubs across the user's neck. This often discourages use of the shoulder belt or both the shoulder belt and the lap belt. The present invention provides a solution to the problem by providing a portable shoulder belt adjuster that can be carried with the user or permanently mounted on the lap belt to permit the user to properly position the shoulder belt regardless of the height of the person.

2. Description of the Prior Art

The Sobokow, et al. U.S. Pat. No. 3,567,247 shows a vehicle shoulder harness arrangement in which the top portion of the shoulder belt is attached to the top of the seat so as to prevent the shoulder belt from chafing the neck of the user.

The McKeever U.S. Pat. No. 4,609,205 shows a separate strap to hold the shoulder belt away from the user's body so as to prevent the shoulder belt from chafing the user during operation of the vehicle.

The Compau U.S. Pat. No. 4,319,769 shows the use of an adjustable tether belt which is attached to the shoulder belt to lower the top attachment point of the shoulder belt to prevent the shoulder belt from extending across the neck of a child. The tether belt is used to hold the top portion of shoulder belt away from the user's neck.

The Law, et al. U.S. Pat. No. 4,348,037 shows the use of an inflatable cushion located underneath the shoulder belt to provide greater support if the user is involved in an automobile crash.

The Ashworth U.S. Pat. No. 4,289,352 shows a strap fastened around the seat with a member extending therethrough for engaging the top portion of the shoulder belt to hold the top portion of the shoulder belt away from the user's neck.

The Pollitt, et al. U.S. Pat. No. 4,236,755 shows a similar strap and connector 28 for holding the top portion of the shoulder belt against the seat to prevent chafing of the user's neck.

BRIEF DESCRIPTION OF THE INVENTION

Briefly, the invention comprises a portable shoulder belt adjuster that clamps to the lap belt to permit a shorter person to position the lower end of the shoulder belt closer toward the center of the user to thereby prevent the upper part of the shoulder belt from rubbing across the user's neck during normal riding or driving conditions.

DESCRIPTION OF THE PREFERRED EMBODIMENT

Figure 1:
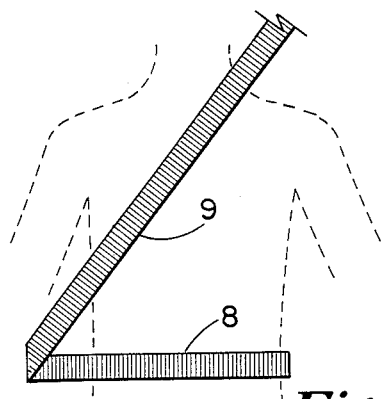
FIG. 1 shows a front view of a user without our shoulder belt adjuster.
Figure 2:
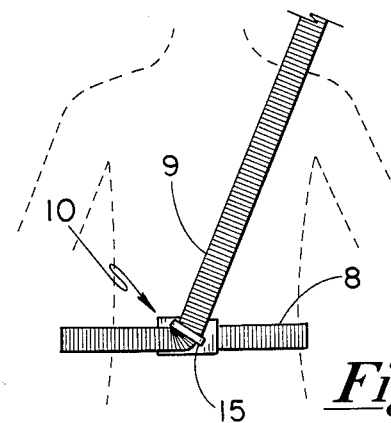
FIG. 2 is a front view of a user with our shoulder belt adjuster.
Figure 3:
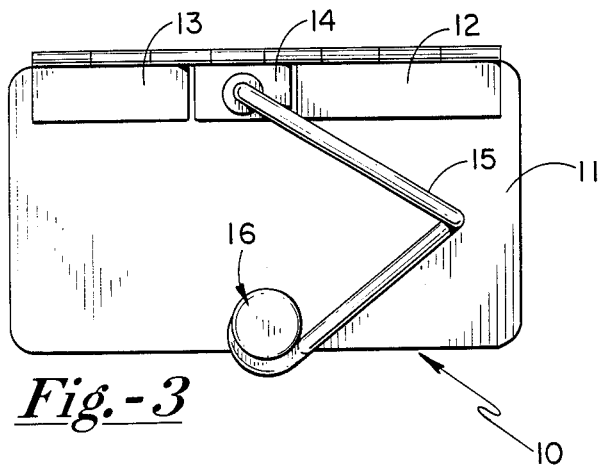
FIG. 3 shows a front view of our shoulder belt adjuster.

Referring to FIG. 1, reference numeral 9, identifies a conventional shoulder belt and reference numeral 8 identifies a conventional lap belt located on an automobile passenger. FIG. 1 also shows how the shoulder belt extends over the user's neck if the user is a shorter person or a child. FIG. 2 shows a similar view of shoulder belt 9 and lap belt 8 except the present invention 10 has been attached to lap belt 8 to move the lower support point for shoulder belt 9 toward the center of the user. Displacement of the lower connecting point of shoulder belt 9 moves the top portion of shoulder belt 9 away from the user's neck thus preventing the shoulder belt 9 from rubbing or chafing the user's neck during normal driving conditions.

Referring to FIGS. 3–6, reference numeral 10 identifies our shoulder belt adjuster which a passenger can carry with him for use as the need arises. Shoulder belt adjuster 10 comprises a housing formed by a front clamp plate 11 and a rear clamp plate 19 which are pivotally connected together through two front hinge plates 12 and 13 and a rear hinge plate 24. Clamp plates 11 and 19 are sufficiently wide to permit a user to clamp lap belt 8 therebetween. Clamping plates 11 and 19 together holds adjuster 10 in a fixed position with respect to lap belt 8. Located on the outside of shoulder belt adjuster 10 is a looped support member 15 which is pivotally connected to hinge plate 24 through a hinge plate 14. Looped support member 15 provides a sliding support for the lower end of shoulder belt 9 and permits the user to move forward in the seat. Located at one end of member 15 is a thumb screw fastening member 16. Thumb screw fastening member 16 comprises a head 16a, a threaded section 24 which extends through an opening member 15 and a retaining washer 25 which prevents fastening member 16 from falling out of the opening in member 15.

Figure 4:
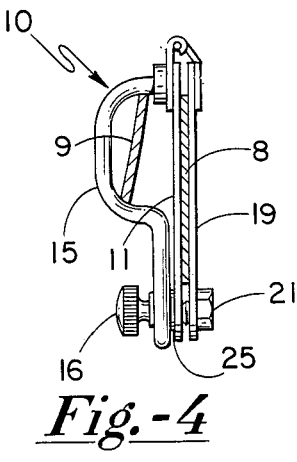
FIG. 4 is an end view of our shoulder belt adjuster of FIG. 3.
Figure 6:
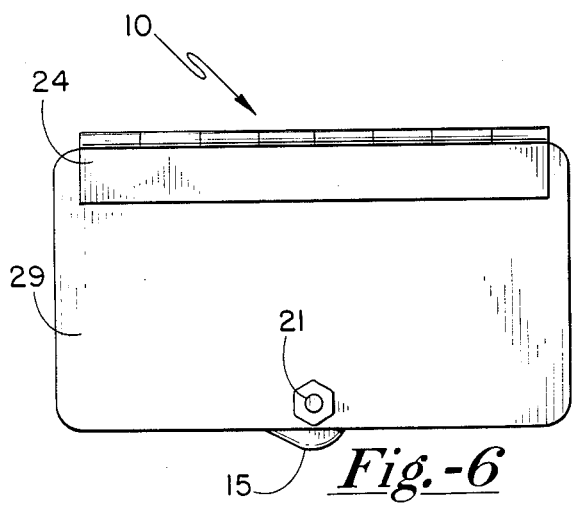
FIG. 6 is a rear view of the shoulder belt adjuster of FIG. 3.
Figure 5:
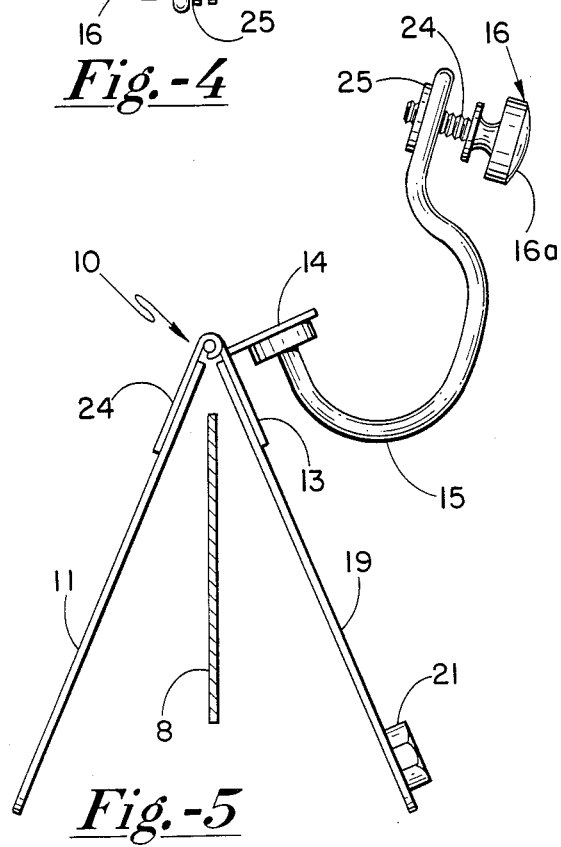
FIG. 5 is an end view of our seat belt adjuster in the open position.

FIG. 4 illustrates how our seat belt adjuster 10 firmly clamps lap belt between clamp plates 11 and 19 which are securely held in pressure contact with lap belt 19 by the coaction of fastening member 16 and the threaded nut 21 which is fastened to plate 19. Fastening member 16 pivots on plate hinge 14 to hold one end of loop member 15 in contact with plate 11. Loop member 15 forms a sufficiently large opening between itself and plate 11 to permit shoulder belt 9 to slide freely therethrough. In operation of our invention, shoulder belt adjuster 10 is fastened to an existing lap belt 8 by inserting the lap belt 8 between plate members 11 and 19 (FIG. 5). Next plate members 11 and 19 are clamped around lap belt 8. The shoulder belt 9 is then placed in looped member 15 and the end of looped member with fastening member 16 is clamped through an opening in plate 11 and into nut 21 on plate 19. The shoulder belt 9 is permitted to slide freely through the opening provided between loop 15 and plate 11.

Figure 7:
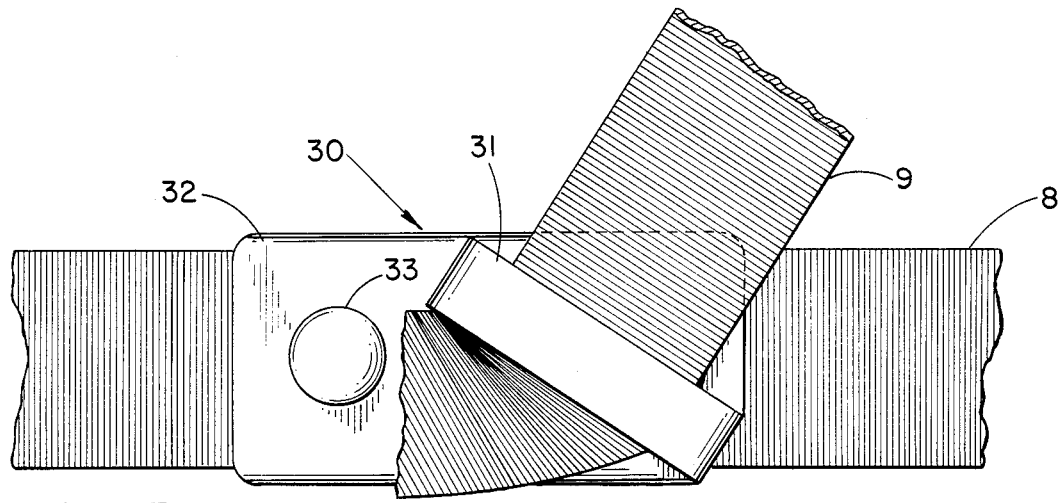
FIG. 7 is a front view of an alternate embodiment of our invention.
Figure 8:
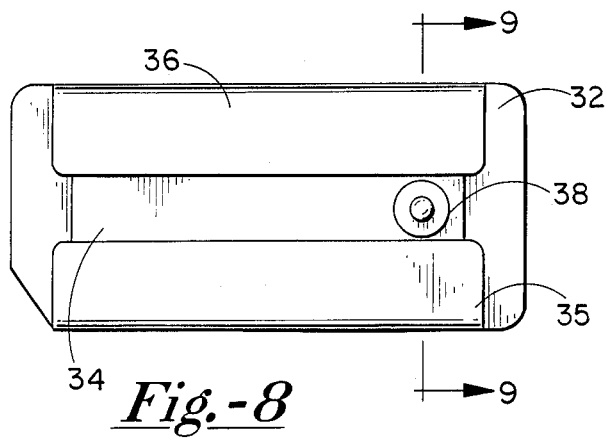
FIG. 8 is a rear view of the embodiment of FIG. 7.
Figures 9, 10:
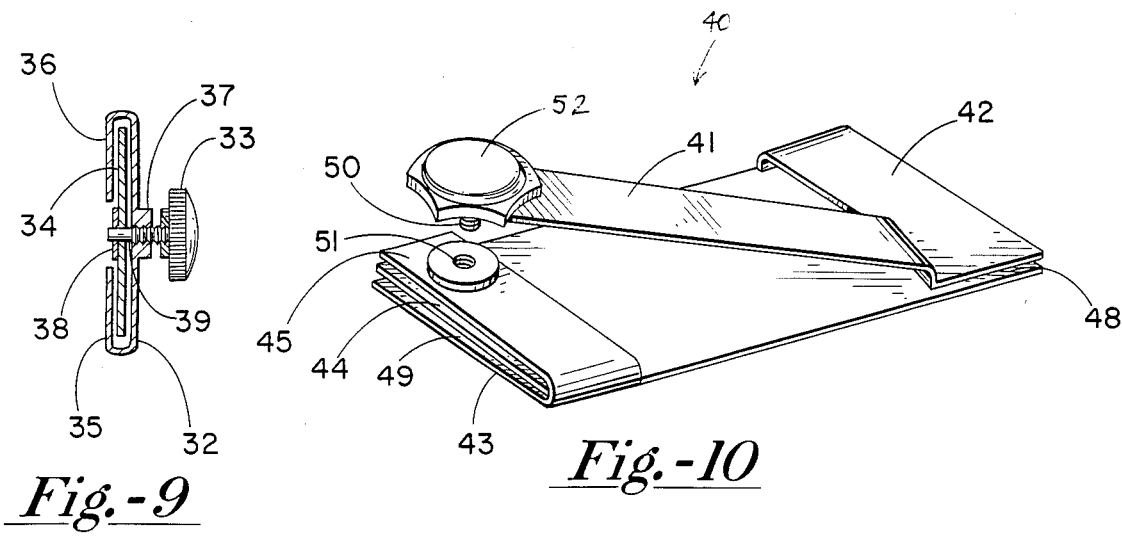
FIG. 9 is a section view taken along lines 9—9 of FIG. 8.
FIG. 10 is an alternate embodiment of a shoulder belt adjuster.

FIG. 7-9 illustrate an alternate embodiment of our invention for use in factory installation of seat and shoulder belts. Reference numeral 30 designates our shoulder belt adjuster comprising a closed loop member 31 for forming a lower fulcrum point of shoulder belt 9 and a transverse member 32 for clamping to lap belt 8. In the embodiment of FIG. 7, loop 31 is closed so that shoulder belt 9 cannot be taken in or out of loop 31. In this embodiment it would be envisioned our shoulder belt adjuster would be installed at the factory before the end of the shoulder belt is fastened to the automobile. However, if the shoulder belt adjuster were to be sold as an automotive after product, loop 31 could be provided with a hinged opening similar to the embodiments shown in FIG. 3 and FIG. 10. FIG. 8 shows a back view of adjuster 30 with flanges 36 and 35 projecting inward to define one side of a clamping surface. Clamping member 34 which is a rectangular plate defines the other clamping surface of adjuster 30. In order to provide lateral adjustment of shoulder belt adjuster 30 along lap belt 8, there is provided a threaded fastening member 33 which pivotally connects to a belt clamp plate 34 so that turning fastening member 33 correspondingly moves belt clamp plate 34. To clamp lap belt 8 in shoulder belt adjuster 30, I rotate thumb screw 33 to force pressure plate 34 against one side of lap belt 8. The opposite side of lap belt 8 is held by flange and clamping members 35 and 36 which extend out from the side of member 30. Clamping members 35 and 36 thus coact with pressure plate 34 to firmly clamp lap belt 8 therebetween. If desired, members 35 and 36 can be connected together to form a continuous loop. With members 35 and 36 connected on the shoulder belt adjuster 30 would be an integral part of the seat belt and lap belt arrangement.

For ease in manufacture of shoulder belt adjuster shown in FIG. 8 it may be desirable to leave a circular opening in members 36 and 35 that are located around washer 38.

FIG. 9 illustrates a cross sectional view of adjuster 30 showing a threaded thumb screw 33, a threaded housing 37 for engaging thumb screw 33. Attached to one end of thumb screw 33 is pressure plate 34 which is held in position by a retaining washer 38 and the shoulder 39 on thumb screw 33. In operation the turning of thumb screw 33 moves thumb screw 33 in and out while correspondingly moving pressure plate 34 toward or away from flanges 35 and 36. With a lap belt located between pressure plate 4 and flanges 36 and 35, it is apparent that one can clamp adjuster 30 to the lap belt.

FIG. 10 illustrates a slightly different version of a portable shoulder belt adjuster 40. Adjuster 40 has a slot 48 formed by plate 43 and top member 42. The open U-shaped slot permits the user to slide the lap belt therein. Similarly, on the other end there is located a slot 49 formed by plate 43 and member 44. The two slots 49 and 48 permit the user to tip the adjuster and slide it onto a lap belt. In order to insert the shoulder belt and clamp the lap belt in the adjuster, a top member 41 extends diagonally across shoulder belt adjuster 40. Located on one end of adjuster 40 is a thumb screw 52 having threads 50 for engaging a threaded recess 51. Since the thread end of thumb screw 52 can be removed, it permits one to insert the shoulder belt under member 41. Next the user starts the threaded member 50 in threaded recess 51. As the thumb screw 52 is tightened, the end of thumb screw pushes on member 44 thereby sandwiching and clamping the lap belt between members 44 and 43.

The shoulder belt adjuster embodiments shown in FIGS. 1-10 are for the left front or driver's use. In order to use our shoulder belt adjuster on the right hand side or passenger side, the loop member is angled in the opposite direction (i.e., mirror image). For example, loop member 15 (FIG. 3) would extend at an angle toward the left rather than the right. Loop member 15 thus directs the shoulder belt over the user's right shoulder rather than the left.

I claim:

1. A shoulder belt adjuster for positioning the lower end of a shoulder belt/lap belt combination to prevent the shoulder belt from rubbing on the neck of a shorter person comprising:
   a housing for attaching to a lap, said housing including a first clamp plate for engaging a first surface of a lap belt and a second clamp plate for engaging a second surface of a lap belt;
   means for temporarily clamping said housing to a lap belt to hold said shoulder belt adjuster in a fixed position on said lap belt;
   a further member connected to said housing, said further member forming a loop for slideably supporting a shoulder belt to permit a user to move forward in the seat;
   said first clamp plate and said second clamp plate coacting to permit a user to laterally position the lower end of the shoulder with respect to the user's body to alter the angle that the should belt extends upward to thereby prevent the shoulder belt from rubbing on the user's neck.

2. The shoulder belt adjuster of claim 1 wherein said means for clamping comprises a threaded member.

3. The shoulder belt adjuster of claim 2 wherein said housing comprises a pair of members connected together by a hinge.

4. The shoulder belt adjuster of claim 3 wherein said further member is pivotally connected to said housing.

5. The shoulder belt adjuster of claim 1 wherein said further member comprises a closed loop for supporting a shoulder belt.

6. The shoulder belt adjuster of claim 1 wherein said housing includes a pair of hinged flat members for sandwiching a portion of a lap belt therebetween to thereby prevent slipping of said shoulder belt adjuster on the lap belt.

* * * * *